United States Patent Office 3,152,481
Patented Oct. 13, 1964

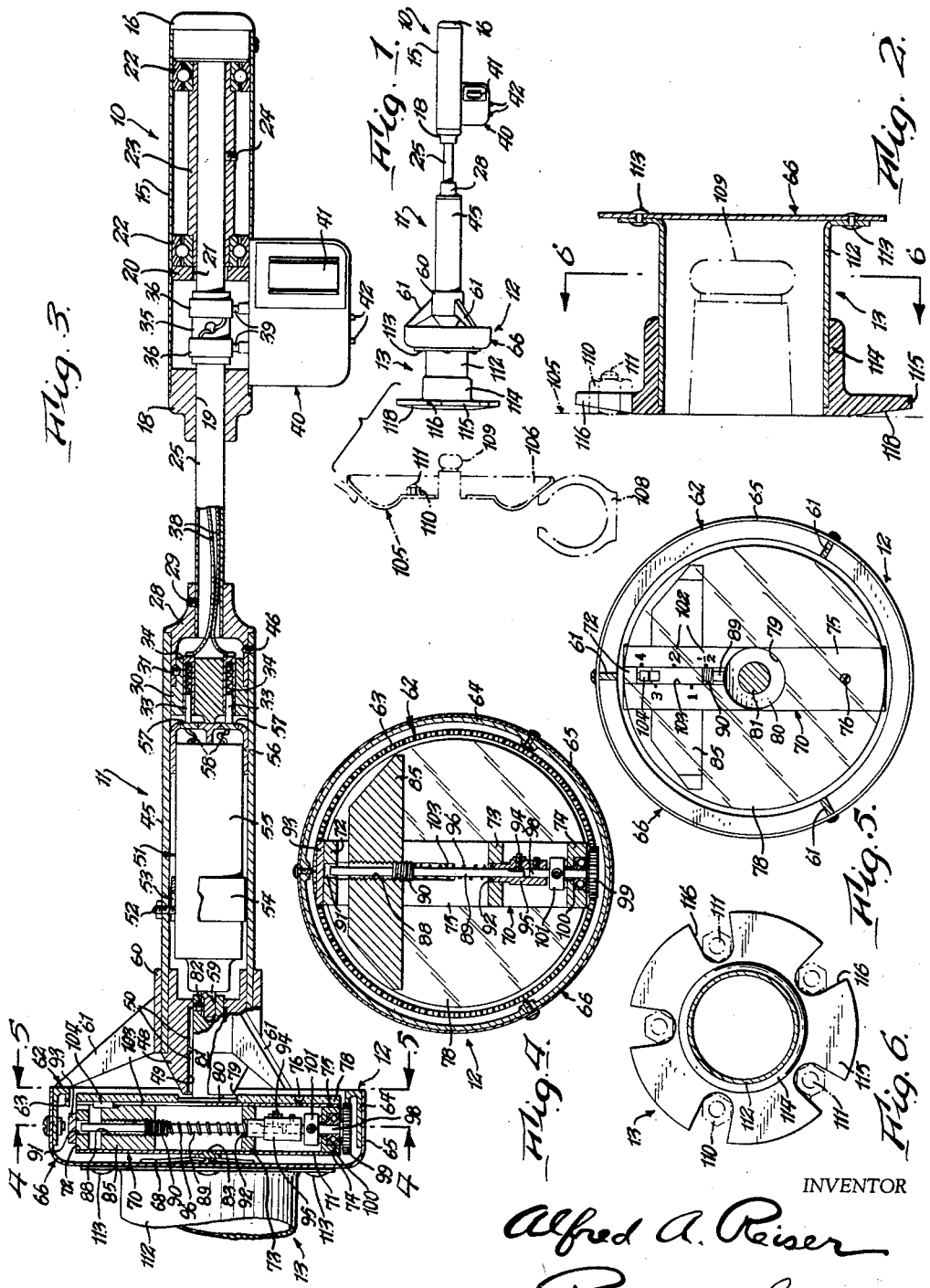

3,152,481
HAND TOOL FOR BALANCING A
ROTATABLE BODY
Alfred A. Reiser, R.D. 1, Lakeshore Road,
Lake View, N.Y.
Filed Dec. 7, 1960, Ser. No. 74,313
16 Claims. (Cl. 73—458)

This invention relates to a mechanism for balancing a rotatable body and is more particularly illustrated as embodied in a tool for balancing automobile wheels, although the features of this invention can be employed wherever the balancing of a rotating body is required. In the balancing of such an automobile wheel, a counterweight of a size determined by the operation of the tool is applied to the rim of the wheel at a point opposite its overweighted side, which point is also determined by the operation of the tool, and usually these weights are provided in increments of one-half ounce as measured at the rim of the wheel.

An object of the invention is to provide a simple and reliable hand tool which is applied to the part to be balanced and which on rotating the part can be adjusted to show not only the size of the counterweight which must be applied to balance the part, but also the position around the rim of the wheel at which the counterweight must be applied to balance the wheel.

Another object of the invention is to provide a simple and direct push button control for such a tool, the operator having merely to press a button to place the balancing tool in operation and to release this button when a weight in the tool reaches a state of counterbalance with the overweighted side of the wheel, it being then merely necessary to bring the wheel to a stop, with the tool still attached, the load indicating not only the size of the weight to be applied, but also exactly indicating where around the rim of the wheel this weight must be applied.

Another object of the invention is to provide such a simple push-button control which can be actuated to reverse the movement of the weight so that in the event of overshooting a state of balance by the tool, the weight can be brought back to exactly counterbalance the overweighted side of the wheel.

Another object is to provide such a mechanism which includes an electric motor for moving the weight in which there is no danger of overloading the motor at either extremity of movement of the weight, the weight merely running off its drive member.

Another object is to provide such a weight in the tool capable of running off the ends of its drive member but in which the drive is immediately restored when the drive member is moved in the proper direction to effect a return movement of the weight.

Another object is to provide such a tool which can be easily and reliably attached to a conventional automobile wheel having the usual hub secured by five stud bolts spaced in a circle around the axis of the wheel.

Another object of the invention is to provide such a tool which is of very rugged construction and free from sensitive parts so that it will stand up under conditions of severe and constant use without getting out of order or requiring repairs.

Another object is to provide such a tool which is very light in weight so as to be easily applied to the part to be balanced and which is sufficiently sensitive in its response to provide acceptable commercial wheel balancing.

Other objects and advantages of the invention will be apparent from the following description and drawings in which:

FIG. 1 is a side elevational view of a tool for balancing the wheel of an automobile, the automobile wheel and associated parts being shown in broken lines.

FIG. 2 is an enlarged vertical longitudinal section through the coupling for attaching the tool to the automobile wheel.

FIG. 3 is a vertical longitudinal section, partly in elevation, through the tool embodying the present invention.

FIGS. 4 and 5 are vertical transverse sections taken generally on the correspondingly numbered lines of FIG. 3.

FIG. 6 is a vertical transverse sectional view taken generally on line 6—6, FIG. 2.

To simplify understanding of the balancing tool forming the subject of the present invention it can be regarded as composed of four major subassemblies, these being a handle-electrical input and slip ring assembly indicated generally at 10; a motor housing and bearing or main carrier assembly indicated generally at 11; a weight carrier assembly indicated generally at 12; and a coupler assembly for attaching the tool to the automobile wheel and indicated generally at 13.

The handle and electrical input and slip ring assembly indicated generally at 10 includes a tubular casing 15 adapted to be grasped by the hand and having an outer end head or plug 16 and opposite inner head or plug 18 provided with a through bore 19. A partition piece 20 is arranged centrally and transversely in the tubular casing 15 and is provided with a bore 21 alined with the bore 19 of the end head 18. Between the partition piece 20 and the end head or plug 16 are arranged a pair of axially spaced ball bearings 22 which jointly support the opposite ends of a tubular holder or adapter 23. In this adapter is secured, as by a set screw 24, a tubular shaft 25 one end of which projects outwardly from the tubular casing 15 through the bores 19 and 21 of the end head 18 and partition piece 20, respectively.

A hub or connection piece 28 is secured to the outer end of the tubular shaft 25, as by a set screw 29, and a cylindrical insulating block 30 is secured within the enlarged outer end of this hub or connection piece as by a set screw 31. A pair of movable contacts 33 are mounted in holders 34 which in turn are mounted in the insulating block 30, the movable contacts being biased to project axially outwardly from the insulating block in the direction opposite from the hub or connection piece 28.

A sleeve 35 of insulation material is fixed to the tubular shaft 25 between the end head 18 and partition piece 20 and a pair of axially spaced slip rings 36 are secured to this sleeve. Each slip ring 36 is connected to a holder 34 for a corresponding movable contact 33 by an electrical wire 38 and each slip ring 36 is engaged by a brush 39 projecting from the casing of a double pole, double throw push button switch indicated generally at 40 and the fingerpiece of which is indicated at 41. The power input terminal pins for the switch 40 are indicated at 42.

The motor housing and bearing assembly indicated generally at 11 includes a tubular casing 45 which at one end fits over the hub or connection piece 28 and can be secured thereto in any suitable manner as by a set screw 46. In the opposite end of this tubular casing 45 is secured a cylindrical bearing block 48 having a through bore 49 containing a pair of needle type bearings 50.

A reversible electrical motor 51 with built-in gear reduction is mounted within the tubular casing 45, prevented from rotating in relation to the tubular casing by a screw pin 52 extending through and threaded in the side wall of the tubular casing 45 and into an axially opening slot 53 in one edge of a cylindrical sleeve 54 fixed to the cylindrical housing 55 of the motor 51. The housing 55 of the motor 51 is capped at one end by a cup-shaped end piece 56 of dielectric material carrying a pair of fixed contacts 57 which make contact with the movable contacts 33. These electrical contacts 57 are electrically connected to the motor 51 by leads 58. The shaft of the motor 51 is indicated at 59.

A cylindrical collar 60 is fixed to the end of the tubular casing 45 remote from the hub or connection piece 28, this collar having three equally spaced radially projecting legs 61. The outer ends of these legs are fixed to a ring gear 62, this ring gear having a plurality of gear teeth 63 which project axially in the direction opposite from the handle electrical input slip ring assembly 10 and are surrounded by an integral cylindrical rim portion 64. To this rim portion 64 of the ring gear 62 is fixed the rim 65 of a cover 66, this cover enclosing the side of the ring gear 62 opposite from the handle electrical input slip ring assembly 10. One or more leaf springs 68 are fixed to the interior of the cover 66 with their inner ends projecting radially toward each other at the axis of the tool and biased axially toward the handle electrical input and slip ring assembly 10.

The weight carrier assembly 12 includes a framework or cage indicated generally at 70 journalled concentrically with respect to the ring gear 62 in the needle bearings 59. This framework is shown as comprising a radially arranged metal bar 71 carrying on one face a row of blocks 72, 73, 74 in diametral arrangement and to the opposite sides of which a metal bar 75 is secured. To this metal bar 75, is secured, as by screws 76, a transparent glass disk 78 which has a round hole 79 in its center. The hub 80 of a stub shaft 81 is arranged in this hole and is fixed to the bar 75 so as to support the framework or cage 70 within the ring gear 62. This stub shaft 81 is journalled in the needle bearings 59 and is connected, as by a set screw 82, with the shaft 59 of the electric motor 51. In line with this stub shaft 81 the metal bar 71 carries a central wear plate or button 83 against which the ends of the spring leaves 68 bear to bias the framework 70 to the right as viewed in FIG. 3.

The framework 70 carries a radially movable eccentric weight 85 which is interposed between the metal bars 71 and 75. This weight 85 has an internally threaded through bore 88 through which a shaft 89 extends, the latter having a threaded enlargement 90 screwed into the threaded bore 88 of the weight 85 and projecting into alining openings 91 and 92 in the blocks 72 and 73, respectively. The upward movement of the shaft 89 is limited by a cap piece 93 fixed to the outer face of the block 72 over its opening 91 and the opposite end of this shaft is fixed against turning, as by a set screw 94, in one end of a sleeve coupling 95, the shaft being free to move axially in this coupling sleeve. A helical compression spring 96 surrounds this shaft 89 and is operatively interposed between its threaded enlargement 90 and the coupling sleeve 95.

This sleeve coupling 95 connects the shaft 89 with the stub shaft 98 of a gear 99. The stub shaft 98 is journalled in a ball bearing 100 in the block 74 and is supported by a thrust collar 101. The gear 99 meshes with the teeth 63 of the ring gear 62.

The purpose of the transparent glass disk 78 is to render visible calibrations 102, in ounces of weight, along a longitudinal slot 103 in the bar 75. These calibrations are traversed by a marker or pointer 104 fixed to the weight 85 within the slot 103.

The weight carrier assembly 12 is coupled to the wheel to be balanced through the coupler assembly 13. The wheel 105 and associated parts are illustrated in broken lines in FIGS. 1, 2 and 6 as including a metal disk 106 to the rim of which the tire 108 is attached and which is removably secured to the axle 109 by five nuts 110 to five concentrically spaced studs 111 extending from the axle through holes in the disk 106.

The coupler assembly 13 comprises a cup or concentric sleeve 112 fixed, as by rivets 113, to the center of the cover 66 to project outwardly therefrom and of sufficient size to receive the hub or end of the axle 109 as shown in FIG. 2. To the sleeve 112 is fixed the hub 114 of a circular plate 115, this plate having five jaws 116 in its face 118 opposing the wheel disk 106, these jaws being uniformly spaced to receive the nuts 110 which secure the wheel disk to the studs 111. Preferably each jaw also has outwardly diverging side walls which engage the hexagonal sides of the nuts and the face 118 is preferably of frusto-conical or convex form, in the order of 5° from a plane perpendicular to its axis, so as to permit the plate to rock upon the surface of the wheel disk 106 in all directions as the wheel moves vertically or laterally due to unbalance.

In use the sleeve 112 is fitted over the hub 109 and the convex face 118 of the plate 115 brought against the wheel disk 106 with the jaws 116 embracing and engaging the nuts 110 which secure this disk to the studs 111. The automobile wheel is then rotated at any suitable speed, say 900 r.p.m., by means of a conventional spinner (not shown) applied to the tire of the wheel. The degree of unbalance can be detected by a conventional vibration indicator (not shown) attached to the bumper of the vehicle or some other part of the chassis. This vibration indicator shows when the balancing tool of the present invention brings the rotating wheel into balance following which the wheel is stopped with the attached balancing tool indicating both the weight in ounces required to bring the wheel into balance and also the place on the rim where this weight must be placed to achieve such balancing.

With the coupling sleeve 112 connected to rotate with the wheel 105, all parts of the tool rotate except the handle 15 and the parts fixed thereto. Thus the coupling sleeve 112 is connected by the rivets 113 to the cover 66 fixed to the ring gear 62 at the ends of the arms 61 of the collar 60 fixed to the tubular casing 45 which in turn is fixed by the set screw 29 to the tubular shaft 25 journalled in the bearings 22 of the handle and electrical input and slip ring assembly 10. Observing from the vibration indicator on the bumper of the automobile that the rotating wheel 105 is out of balance and assuming that the balancing weight 85 of the tool has been drawn the maximum extent toward the axis of rotation of the tool, the operator moves the fingerpiece 41 of the double pole, double throw switch 40 in the direction which energizes the motor 51 to start slow outward movement of the weight 85. The motor is energized from current supplied at the terminals 42 via this double pole double throw switch, the brushes 39 and slip rings 36, the wires 38, and the movable and fixed contacts 33, 57 and leads 58.

This energization of the electric motor 51, through its built in gear reduction, output shaft 59, and stub shaft 81 fixed to the cross bar 75 rotates the framework or cage 70 of which this cross bar forms a part, this cage also including the blocks 72, 73 and 74 and the opposite cross bar 71. This cage is rotated at a very slow speed, in the order of one revolution every ten seconds, relative to the other parts of the tool which are also rotating with the wheel. Accordingly it will be seen that the weight 85 rotates around the wheel 105 once every ten seconds, this weight thereby coming into phase with the heavy or overbalanced side of the wheel once every ten seconds so as to add to the unbalance of the wheel and likewise reaching a position 180° out of phase with the heavy side of the wheel so as to have a counterbalancing effect on the wheel.

As the framework or cage 70 so rotates one revolution every ten seconds the pinion 99 rotates by reason of its meshing with the ring gear 62. Through the coupling 95 this rotates the screw shaft 89 in the direction to cause its threads 90 to screw into the threads 88 at the outer end of the bore through the weight 85 and move this weight radially outwardly. When the weight is in the extreme inward position, as was assumed at the start of this sequence of operation, its threads 88 are disengaged from the threads 90 of the screw shaft 89, and as rotary movement of the screw shaft is caused to take place in the proper direction the threads 88 will immediately engage the threads 90 of the screw shaft 89 thus permitting weight 85 to start progress outwardly. Immediate engagement of the threads 88 with the threads 90 is positively assured at all times due to centrifugal force acting upon the weight 85. If the operator inadvertently had moved the fingerpiece 41 of the double pole, double throw switch in the wrong direction so that the reversible motor 51 and hence the screw shaft 89 were driven in the direction to move the weight 85 inwardly nothing would happen because the weight is assumed to be at its extreme inward position in which position its threads 88 are out of engagement with the threads 90 of the screw shaft 89 so that such reverse rotation of the screw shaft 89 would be ineffective. It will also be seen that this provides a safety factor since holding the fingerpiece 41 of the double pole, double throw switch in its position for moving the weight 85 inwardly for an excessive period of time merely causes the threaded bore 88 to ride off the threads 90 of the screw shaft 89 and thereby cause the screw shaft to idle. The weight similarly rides off the outer end of the threads 90 of the screw 89 as hereinafter described.

The weight 85 is thereby rotating with the unbalanced wheel 105 but at the same time is moving both radially and rotatively with respect to the wheel so as to traverse a spiral path with respect to the wheel. With such spiral scanning of the wheel, the weight 85 on each revolution of its scanning comes into phase with the unbalanced side of the wheel 105 with a resultant increased indication of unbalance on the vibration indicator (not shown) following which it comes to a position 180° out of phase with the unbalanced side of the wheel so as to in part counterbalance the unbalance of the wheel and result in reduced indication of unbalance on the vibration indicator. As the weight travels radially outwardly the contrast of minimum and maximum unbalance on the vibration indicator increases until sooner or later the weight 85 comes into the desired degree of counterbalance with the unbalance of the wheel at which point zero unbalance is indicated on the vibration indicator.

At this point the operator releases the fingerpiece 41 of the double pole, double throw motor switch 40 and with the tool still attached brings the wheel 105 to rest. Upon now turning the wheel and the attached tool to bring the scale 102 upright, the exact amount of additional weight required and its exact location around the rim of the wheel 105 can be exactly determined. Thus the amount of additional weight needed can be read directly on the scale 102 by reference to the pointer 104, this reading calling for three and one-half ounces of added weight as viewed in FIG. 5. The location of this added weight is at the rim of the wheel, directly above and in line with the central axis of the scale 102.

If the operator should fail to release the fingerpiece 41 when the weight 85 reaches exact counterbalance with unbalance of the wheel, the vibration indicator (not shown) on the bumper of the vehicle would indicate that the tool is working to aggravate the unbalance. Accordingly all the operator has to do is to reverse the position of the fingerpiece 41 of the double pole, double throw motor switch 40 thereby to reverse the motor 51. With such reversal, the weight 85 is moved inwardly along a spiral scanning path until a state of balance of this weight with the unbalance of the wheel is again achieved following which the wheel and tool are brought to rest and the amount and exact location required of the corrective weight noted and the corrective weight applied.

As previously indicated, when the weight 85 is at the minimum weight effect position or that closest to the central axis of the tool, the weight 85 will be off the threads 90 of the screw shaft 89 but will always attempt to engage these threads due to centrifugal force of the weight in the rotating tool. On the other hand when the weight is at the extreme point of weight effect or at the outward point radially it will automatically disengage itself from the outer end of the threaded section 90. It will not reengage this threaded section 90 until the shaft 89 is placed in motion in the right direction to screw itself into the threaded bore 88. At this time the screw 89 itself is also subject to centrifugal force and the force of the helical compression spring 96 will also cause the threaded section 90 to thrust itself into engagement with the threads 88 and upon being rotated in the right direction to propel the weight toward the central axis of rotation of the tool.

The arrangement therefore provides for motor protection. Disengagement of the weight at each of its two extreme positions assures that the motor will not be subjected to overloading in the event the operator holds the motor circuit closed beyond the point of maximum weight travel.

With the tool of the present invention the weight is progressing simultaneously both rotatively and radially with respect to the wheel and hence at some point in the weight travel it necessarily comes into effective counterbalance with the unbalance of the wheel. This is done to a tolerance which is well within the needs of good commercial balancing and by simply bringing the wheel and attached tool to rest, both the amount and position of the weight required for permanent balancing of the wheel can be directly observed.

I claim:

1. A tool for determining both the position and amount of counterweight required to balance a body rotating about an axis, comprising a carrier, a handle rotatably supporting said carrier for rotation about said axis, means coupling said carrier to said body for rotation therewith about said axis, weight means mounted on said carrier and guided for simultaneous change in centrifugal weight effect and rotative progressive movement with respect to said axis whereby said weight means moves in a spiral path centered on said axis and at some point in the travel of said weight means it comes into counterbalance with any unbalance of said body, drive means compelling said weight means to follow said path, and means controlled by the operator for starting and stopping said drive means.

2. A tool for determining both the position and amount of counterweight required to balance a body rotating about an axis, comprising a carrier, a handle rotatably supporting said carrier for rotation about said axis, means coupling said carrier to said body for rotation therewith about said axis, weight means mounted on said carrier and guided for simultaneous change in centrifugal weight effect and rotative progressive movement with respect to said axis whereby said weight means moves in a spiral path centered on said axis and at some point in the travel of said weight means it comes into counterbalance with any unbalance of said body, drive means compelling said weight means to follow said path, and means controlled by the operator for starting, stopping and reversing said drive means at any time.

3. A tool for determining both the position and amount of counterweight required to balance a body rotating about an axis, comprising a carrier, a handle rotatably supporting said carrier for rotation about said axis, means coupling said carrier to said body for rotation therewith about said axis, a framework rotatively journalled in said carrier for rotation about said axis, a screw rotatively journalled in said framework diametrically to said axis, a weight mounted on said framework for movement lengthwise of said screw and having threaded engagement therewith, drive means compelling simultaneous rotation of said framework and screw with respect to said carrier about their said two respective axes to progressively move said weight both radially and rotatively with respect to said body whereby said weight is compelled to move in a spiral path centered on said first mentioned axis and at some point in the travel of said weight it comes into counterbalance with any unbalance of said body, and means controlled by the operator for starting, stopping and reversing said last named means.

4. A tool for determining both the position and amount of counterweight required to balance a body rotating about an axis, comprising a carrier, a handle rotatably supporting said carrier for rotation about said axis, means coupling said carrier to said body for rotation therewith about said axis, a framework journalled in said carrier for rotation about said axis, a ring gear fastened to said carrier concentric with said axis adjacent said framework, a screw journalled in said framework and extending diametrally with respect to said axis, a pinion fastened to said screw and meshing with said ring gear, a weight mounted on said framework for movement lengthwise of said screw and having threaded engagement therewith, means rotating said framework about said axis with respect to said carrier thereby to progressively move said weight both radially and rotatively with respect to said body whereby at some point in the travel of said weight it comes into counterbalance with any unbalance of said body, and means controlled by the operator for starting, stopping and reversing said last named means.

5. In a tool for determining both the position and amount of counterweight required to balance a rotating body about an axis and having a carrier and a handle rotatably supporting said carrier for rotation about said axis, the combination therewith of a means for coupling said carrier to an automobile wheel having a hub and stud nuts arranged in a circle around said axis and projecting axially from the face of said hub, comprising a cup-shaped member adapted to fit over said hub and connected at its closed end to said carrier, and an annular face plate fixed to and radiating outwardly from the rim of said cup-shaped member and having radial notches extending inwardly from its perimeter adapted to fit said nuts, the face of said face plate opposing said automobile wheel being of convex form concentric with said axis to permit said coupling to rock upon the face of said body in all directions as the body moves vertically or laterally due to unbalance.

6. A tool for determining both the position and amount of counterweight required to balance a body rotating about an axis comprising a carrier, a handle rotatably supporting said carrier for rotation about said axis, means coupling said carrier to said body for rotation therewith about said axis, a framework rotatively journalled in said carrier for rotation about said axis, a screw shaft rotatively journalled in said framework to extend diametrally with respect to said axis and having a threaded section intermediate its length, a weight mounted on said framework for movement lengthwise of said screw and having threaded engagement with said threaded section, said weight being capable of running off opposite ends of said threaded section, drive means compelling simultaneous rotation of said framework and screw shaft about their said two respective axes to progressively move said weight both radially and rotatively with respect to said body whereby said weight is compelled to move in a spiral path centered on said first mentioned axis and at some point in the travel of said weight it comes into counterbalance with any unbalance of said body, and means for starting, stopping and reversing said last named means.

7. A tool as set forth in claim 6 wherein a helical compression spring around said screw shaft biases said screw shaft axially in one direction to effect engagement between said screw shaft and weight when said screw shaft is turned in a corresponding direction.

8. In a device for determining the position and amount of counterweight required to balance a body rotating about an axis, a carrier to be coupled to the body for rotation therewith about said axis, weight means guided by said carrier for change in the circumferential position and the centrifugal weight effect thereof relative to said carrier and the body, and a single weight moving assembly operatively associated with said weight means and said carrier and including means for simultaneously changing the circumferential position and the centrifugal weight effect of said weight means.

9. In a device as set forth in claim 8, said weight moving assembly including manually operated means for starting, stopping and reversing the last-named means.

10. In a device for determining the position and amount of counterweight required to balance a body rotating about an axis, a carrier to be coupled to the body for rotation therewith about said axis, weight means carried by said carrier and guided for change in the respects of its circumferential position and its centrifugal weight effect relative to said carrier and the body, control means on said carrier including a control element coupled to said weight means, said control element being relatively rotatable in opposite directions for causing the weight means to change in one of said respects relative to the carrier, motion transmitting means between said carrier and said weight means for causing the weight means to change in the other of its respects relative to the carrier upon relative rotation of said control element, and manually controlled means for starting, stopping and reversing rotation of said control element, said control element when stopped accommodating conjoint rotation of said weight means and said carrier and when started or reversed simultaneously changing the centrifugal weight effect of said weight means and causing rotative progressive or retrogressive movement of said weight means relative to said carrier and the body whereby at some point in the travel of said weight means it comes into counterbalance with any unbalance of the body.

11. In a device for determining the position and amount of counterweight required to balance a body rotating about an axis, a carrier to be coupled to the body for rotation therewith about said axis, a motion transmitting member on said carrier concentric with said axis, framework means journalled on said carrier about said axis, shaft means journalled in said framework means transversely of said axis, a motion transmitting member on said shaft means operatively coupled with said motion transmitting member on said carrier, a second motion transmitting member on said shaft means, a counterweight movably mounted on said framework means for change in the centrifugal weight effect thereof and including an actuator operatively coupled with said second motion transmitting member on said shaft means, and a control for causing rotation of one of said means relative to said carrier thereby simultaneously to change the circumferential position and the centrifugal weight effect of said counterweight relative to said axis.

12. A device as set forth in claim 11, said control including manually operated means for starting, stopping and reversing relative rotation of said one means.

13. In a device for determining the position and amount of counterweight required to balance a body rotating about an axis, first means comprising a rotary assembly to be coupled to the body for rotation therewith about said axis, second means comprising a rotary assembly journalled coaxially on said first means, counterweight means on said second rotary means conjointly rotatable therewith and movable relative thereto for change in its centrifugal weight effect, third means comprising motion transmitting means between said first and second means normally coupling the two for conjoint rotation and operable to produce relative rotation therebetween for changing the circumferential position of said counterweight means relative to said first means, fourth means comprising motion transmitting means between said second means and said counterweight means normally coupling the two for conjoint rotation and operable to change the centrifugal weight effect of the counterweight means, fifth means comprising control means for starting, stopping and reversing one of said motion transmitting means, and means coupling the other motion transmitting means to one of said first means, said one of said motion transmitting means and said control means.

14. A method of balancing an unbalanced body rotating about an axis, comprising the steps of rotating a counterweight means with the body about said axis, simultaneously and progressively changing the centrifugal weight effect and circumferential position of the counterweight means relative to the body to cause the counterweight means to pass successively with successively changing effect into and out of phase with the unbalance of the body until the counterweight means counterbalances the unbalance of the body, and thereafter rotating the counterweight means conjointly with the body.

15. A portable hand tool for determining both the position and the amount of counterweight required to balance a body rotating about an axis, comprising a carrier, a handle journalled on said carrier to be grasped by the operator of the tool for rotatably supporting said carrier for rotation about said axis, means movably mounted on said carrier to indicate both the position and the amount of counterweight required to balance said body, means operable from said handle and controlled by the operator for starting, stopping and reversing the movement of said indicating means, and a clampless adapter fixed to the end of said carrier remote from said handle and having an end face forced into concentric abutting relation with said body by manual pressure exerted axially from said handle to obtain rotation of said carrier through power derived from said body without necessity for clamping the carrier to the body.

16. The combination set forth in claim 15 wherein said rotating body comprises an automobile wheel fixed to an axle by a concentric circle of regularly spaced fasteners protruding from the face of said wheel and wherein said clamping adapter comprises a sleeve concentric with said axle and handle and an annular face plate fixed to and radiating outwardly from the end of said sleeve remote from said handle, said face plate defining a plurality of generally radially extending slots facing said body and spaced to receive said fasteners regardless of the size of said circle which they define.

References Cited in the file of this patent

UNITED STATES PATENTS

| | | |
|---|---|---|
| 2,696,108 | Hrebicek | Dec. 7, 1954 |
| 2,731,833 | Jones | Jan. 24, 1956 |
| 2,739,482 | Reisser et al. | Mar. 27, 1956 |
| 2,972,256 | MacMillan | Feb. 21, 1961 |
| 3,016,751 | De Villiers | Jan. 16, 1962 |

FOREIGN PATENTS

| | | |
|---|---|---|
| 687,779 | Great Britain | Feb. 18, 1953 |